(12) United States Patent
El-Sherif (10) Patent No.: US 8,805,136 B2
(45) Date of Patent: *Aug. 12, 2014

(54) ON-FIBER TUNABLE BRAGG GRATINGS FOR DWDM APPLICATIONS

(75) Inventor: Mahmoud A. El-Sherif, Penn Valley, PA (US)

(73) Assignee: Photonics On-Fiber Devices, Inc., Philadelphia, PA (US)

( * ) Notice: Subject to any disclaimer, the term of this patent is extended or adjusted under 35 U.S.C. 154(b) by 301 days.

This patent is subject to a terminal disclaimer.

(21) Appl. No.: 11/430,783

(22) Filed: May 8, 2006

(65) Prior Publication Data

US 2007/0258673 A1 Nov. 8, 2007

(51) Int. Cl.
*G02B 6/34* (2006.01)

(52) U.S. Cl.
USPC ......... 385/37; 385/2; 385/8; 385/10; 359/240

(58) Field of Classification Search
CPC ..... G02F 1/0118; G02F 1/035; G02F 1/0356; G02F 1/065; G02F 1/1326; G02F 1/3131; G02F 1/3132; G02F 2201/15; G02F 2201/302; G02F 2203/026
USPC .............. 385/2–50, 122–145; 372/6; 359/240
See application file for complete search history.

(56) References Cited

U.S. PATENT DOCUMENTS

| | | | | |
|---|---|---|---|---|
| 3,891,302 A | * | 6/1975 | Dabby et al. | 385/37 |
| 4,006,963 A | * | 2/1977 | Baues et al. | 385/37 |
| 4,179,187 A | * | 12/1979 | Maurer | 385/123 |
| 4,400,056 A | * | 8/1983 | Cielo | 385/27 |
| 4,593,969 A | * | 6/1986 | Goodman et al. | 385/37 |
| 4,725,110 A | * | 2/1988 | Glenn et al. | 359/3 |
| 4,793,680 A | * | 12/1988 | Byron | 385/37 |
| 4,842,405 A | * | 6/1989 | El-Sherif | 385/37 |
| 4,929,050 A | * | 5/1990 | Wilson | 250/227.17 |
| 4,953,939 A | * | 9/1990 | Epworth | 398/147 |
| 4,974,930 A | * | 12/1990 | Blyler et al. | 385/28 |

(Continued)

FOREIGN PATENT DOCUMENTS

| | | | |
|---|---|---|---|
| FR | 2560394 A1 | * | 8/1985 |
| JP | 03127019 A | * | 5/1991 |
| JP | 2002318373 A | * | 10/2002 |

OTHER PUBLICATIONS

Jianming Yuan and Mahmoud A. El-Sherif, "Fiber-Optic Chemical Sensor Using Polyaniline as Modified Cladding Material," Feb. 2003, IEEE Sensors Journal, vol. 3, No. 1., pp. 5-12.*

(Continued)

*Primary Examiner* — Peter Radkowski
(74) *Attorney, Agent, or Firm* — Kinney & Lange, P.A.

(57) ABSTRACT

A method and apparatus for tunable on-fiber Bragg gratings for DWDM and other applications on a small section of the core of single mode communication of an optical fiber. The method comprises etching most of the cladding on a small section of the fiber; coating the etched portion with a metallic electrode material and then with a layer of an electrooptic material; coating the electrooptic material with a photoresist; producing the Bragg grating pattern using a holographic process or on-axis interferometry; dissolving the non-exposed photoresist,; etching the grating pattern into the electrooptic material, and coating the Bragg gratings with a metallic material constructing the outer electrode. The presence of an electric signal on the electrodes will change the optical properties of the electrooptic material, as well as the diffraction/reflection properties of the Bragg gratings.

19 Claims, 14 Drawing Sheets

(56) References Cited

U.S. PATENT DOCUMENTS

| | | | | |
|---|---|---|---|---|
| 5,067,788 | A * | 11/1991 | Jannson et al. | 385/2 |
| 5,237,576 | A * | 8/1993 | DiGiovanni et al. | 372/6 |
| 5,317,667 | A * | 5/1994 | Weber et al. | 385/147 |
| 5,455,618 | A * | 10/1995 | Hatori | 347/261 |
| 5,488,681 | A * | 1/1996 | Deacon et al. | 385/37 |
| 5,497,386 | A * | 3/1996 | Fontana | 372/18 |
| 5,504,772 | A * | 4/1996 | Deacon et al. | 372/102 |
| 5,572,357 | A * | 11/1996 | Nakazato et al. | 359/341.33 |
| 5,633,966 | A * | 5/1997 | Nakaishi | 385/37 |
| 5,864,641 | A * | 1/1999 | Murphy et al. | 385/12 |
| 5,920,582 | A * | 7/1999 | Byron | 372/6 |
| 5,937,115 | A * | 8/1999 | Domash | 385/16 |
| 6,011,881 | A * | 1/2000 | Moslehi et al. | 385/10 |
| 6,041,070 | A * | 3/2000 | Koch et al. | 372/6 |
| 6,058,226 | A * | 5/2000 | Starodubov | 385/12 |
| 6,104,852 | A * | 8/2000 | Kashyap | 385/123 |
| 6,137,819 | A * | 10/2000 | Najda | 372/96 |
| 6,192,177 | B1 * | 2/2001 | Amundson et al. | 385/37 |
| 6,236,782 | B1 * | 5/2001 | Kewitsch et al. | 385/43 |
| 6,295,304 | B1 * | 9/2001 | Koch et al. | 372/6 |
| 6,301,272 | B1 * | 10/2001 | Koch et al. | 372/6 |
| 6,353,690 | B1 * | 3/2002 | Kulishov | 385/10 |
| 6,356,674 | B1 * | 3/2002 | Davis et al. | 385/10 |
| 6,404,966 | B1 * | 6/2002 | Kawanishi et al. | 385/125 |
| 6,427,041 | B1 * | 7/2002 | Strasser et al. | 385/37 |
| 6,529,676 | B2 * | 3/2003 | Eggleton et al. | 385/142 |
| 6,563,985 | B2 * | 5/2003 | Yin et al. | 385/37 |
| 6,575,965 | B1 * | 6/2003 | Fitch et al. | 606/15 |
| 6,603,902 | B1 * | 8/2003 | So | 385/37 |
| 6,608,952 | B2 * | 8/2003 | Eggleton et al. | 385/43 |
| 6,690,873 | B2 * | 2/2004 | Bendett et al. | 385/132 |
| 6,700,697 | B2 * | 3/2004 | Nikolajsen et al. | 359/341.32 |
| 6,810,178 | B2 * | 10/2004 | Davis et al. | 385/37 |
| 6,813,291 | B2 * | 11/2004 | Wang et al. | 372/46.014 |
| 6,859,567 | B2 * | 2/2005 | Galstian et al. | 385/1 |
| 6,915,040 | B2 * | 7/2005 | Willner et al. | 385/37 |
| 6,928,199 | B2 * | 8/2005 | Galstian et al. | 385/10 |
| 6,970,494 | B1 * | 11/2005 | Bendett et al. | 372/102 |
| 6,993,212 | B2 * | 1/2006 | Block et al. | 385/3 |
| 7,062,114 | B2 * | 6/2006 | Webjorn et al. | 385/14 |
| 7,085,439 | B2 * | 8/2006 | Andrieu et al. | 385/10 |
| 7,149,391 | B1 * | 12/2006 | El-Sherif | 385/50 |
| 7,181,107 | B2 * | 2/2007 | Martinez | 385/37 |
| 7,203,399 | B2 * | 4/2007 | Ishikawa et al. | 385/37 |
| 7,228,012 | B2 * | 6/2007 | El-Sherif | 385/2 |
| 7,409,133 | B2 * | 8/2008 | Dimmick et al. | 385/123 |
| 7,539,361 | B2 * | 5/2009 | Dimmick et al. | 385/12 |
| 2001/0014200 | A1 * | 8/2001 | Albert et al. | 385/129 |
| 2002/0008913 | A1 * | 1/2002 | Yin et al. | 359/578 |
| 2002/0071646 | A1 * | 6/2002 | Eggleton et al. | 385/125 |
| 2002/0146047 | A1 * | 10/2002 | Bendett et al. | 372/40 |
| 2002/0172463 | A1 * | 11/2002 | Romanovsky | 385/37 |
| 2003/0034538 | A1 * | 2/2003 | Brophy et al. | 257/444 |
| 2003/0103708 | A1 * | 6/2003 | Galstian et al. | 385/1 |
| 2003/0161022 | A1 * | 8/2003 | Lazarev et al. | 359/245 |
| 2003/0174948 | A1 * | 9/2003 | Davis et al. | 385/37 |
| 2003/0235368 | A1 * | 12/2003 | Kulishov et al. | 385/40 |
| 2004/0115824 | A1 * | 6/2004 | Ponce et al. | 436/164 |
| 2004/0151433 | A1 * | 8/2004 | Galstian et al. | 385/37 |
| 2004/0170371 | A1 * | 9/2004 | Arkhipov et al. | 385/141 |
| 2004/0175188 | A1 * | 9/2004 | Bellemare et al. | 398/186 |
| 2004/0201891 | A1 * | 10/2004 | Schrader | 359/558 |
| 2005/0201674 | A1 * | 9/2005 | Ellwood | 385/17 |
| 2006/0093012 | A1 * | 5/2006 | Singh et al. | 372/102 |
| 2006/0203328 | A1 * | 9/2006 | Lazarev et al. | 359/321 |
| 2006/0280217 | A1 * | 12/2006 | Zervas et al. | 372/72 |
| 2007/0025661 | A1 * | 2/2007 | Wang et al. | 385/37 |
| 2007/0280304 | A1 * | 12/2007 | Deile et al. | 372/6 |
| 2008/0085087 | A1 * | 4/2008 | Dimmick et al. | 385/123 |

OTHER PUBLICATIONS

Ryoung-Han Kim, "Design and Fabrication of Highly Efficient Electrooptic Modulators Using Bragg Grating Reflectors," Dissertation, Electrical Engineering, Texas A&M University, Dec. 2005.*

Ma et al. "Power-dependent Bragg diffraction of a waveguide grating covered with polyaniline/PMMA" Optics Communications 149 (1998), pp. 8-12.*

Yuan et al. "Fiber-Optic Chemical Sensor Using Polyaniline as Modified Cladding Material" IEEE Sensors Journal, vol. 3., No. 1, Feb. 2003, pp. 5-12.*

El-Sherif "On-Fiber Sensor and Modulator" IEEE Transactions on Instrumentation and Measurement, vol. 38, No. 2, Apr. 1989, p. 595-598.*

El-Sherif "On-Fiber Sensor and Modulator" IEEE Transactions on Instrumentation and Measurement, vol. 38, No. 2, Apr. 1989, p. 595-598.*

Ma et al. "Power-dependent Bragg diffraction of a waveguide grating covered with polyaniline/PMMA" Optics Communiations 149 (1998), pp. 8-12.*

Yuan et al. "Fiber-Optic Chemical Sensor Using Polyaniline as Modified Cladding Material" IEEE Sensors Journal, vol. 3., No. 1, Feb. 2003, pp. 5-12.*

* cited by examiner

ON-FIBER TUNABLE BRAGG GRATINGS FOR DWDM APPLICATIONS

FIELD OF THE INVENTION

This invention relates to fiber optics and more particularly to an apparatus and method for constructing tunable Bragg gratings on an optical fiber core for uses as optical multiplexer, de-multiplexer, coupler, or filter. The invention is used for dense wavelength division multiplexing, (DWDM), optical filters, or other devices.

BACKGROUND OF THE INVENTION

This is an improvement of U.S. Pat. No. 4,842,405, where I am able to provide a tunable on-fiber Bragg gratings for telecommunication and other applications. The Bragg gratings are used in telecommunication links as a means for multiplexing, demultiplexing, coupling, or filtering optical signals at the Bragg wavelength. It is desirable to impart Bragg grating patterns on the surface of optical fibers. The methods available of producing Bragg gratings on the surface of optical fibers are essentially limited to producing the gratings on a flattened portion of the fiber and the grating thus produced covers only a small percent of the surface of the optical fiber core resulting in a polarization dependent structure. The only exception is the U.S. Pat. No. 4,842,405 which provides a method for constructing polarization independent Bragg gratings onto the entire cylindrical surface of the optical fiber, however, the Bragg gratings are not tunable.

It would be of great advantage for the art if tunable multiplexers, demultiplexers, couplers and filters could be built by forming tunable Bragg gratings on the entire cylindrical surface of the optical fiber core in a small section of the fiber is disclosed.

Another advantage would be to impose tunable gratings on the entire surface of the optical fiber as a polarization independent apparatus, the application of the device in telecommunication systems is vastly increased.

Other advantages will appear hereinafter.

SUMMARY OF THE INVENTION

It has now been discovered that the above and other advantages of the present invention may be achieved in the following manner. This invention is directed to an apparatus and method for building tunable multiplexers, demultiplexers, couplers and filters by producing a tunable Bragg grating structure on a section of an optical fiber wherein the grating pattern is written into an electrooptic material coated onto the fiber core to cover the entire cylindrical surface of the modified section.

The method for producing the tunable gratings on the surface of the fiber core requires etching the cladding layer on a small section of the fiber to reduce the thickness of the cladding layer to a very thin layer, then, coating the modified section of the optical fiber with a thin layer of metallic material. This coating forms the inner metallic electrode. Then, the inner electrode is coated with a layer of an electrooptic material. Various methods can be used for writing the gratings into the electrooptic material, using a photoresisit coating. The photoresist coated on the electrooptic material is exposed to an interference pattern produced from a laser light source. The exposed photoresist is developed to produce therein a Bragg grating pattern on the modified section of the optical fiber. The produced Bragg grating pattern is reproduced into the surface of the electrooptic material in the modified section. Then, a layer of metallic material is coated on the top of the electrooptic material. This coating forms the outer metallic electrode. To facilitate the exchange of optical signal between this modified fiber and other communication links, this fiber is connected to a bi-directional coupler or it is mounted on a photonics chip. Packaging of the device requires coating the modified section with an external cladding.

An alternative structure of the apparatus is achieved by writing the gratings into the cladding layer next to the fiber core before applying the eletrooptic material. This requires etching the cladding in a small section of the fiber to reduce the thickness of the cladding layer to a few micrometers. Then, this modified section of the optical fiber is coated with a photoresist, and exposing the photoresist to an interference pattern produced from a laser light source. The exposed photoresist is developed to produce therein a Bragg grating pattern on the modified section of the optical fiber, followed by etching the Bragg grating pattern into the thin cladding layer next to the core, in the modified section. A multilayer coating is applied on the top of the Bragg gratings wherein an inner metallic electrode layer, an electrooptic material layer, and an outer metallic electrode layer are coated on the top of the Bragg gratings. All these coatings are applied uniformly in a cylindrical shape for a polarization independent tunable Bragg gratings structure. Packaging of the device is performed in the same way as above.

BRIEF DESCRIPTION OF THE DRAWINGS

The invention described herein is shown by reference to the drawings, although it is to be understood that the drawings are referred to only for purposes of illustration and example, and the scope of the invention is not limited thereto. For a more complete understanding of the invention, reference is hereby made to the drawings, in which.

DETAILED DESCRIPTION OF THE PREFERRED EMBODIMENT

Figure 1:
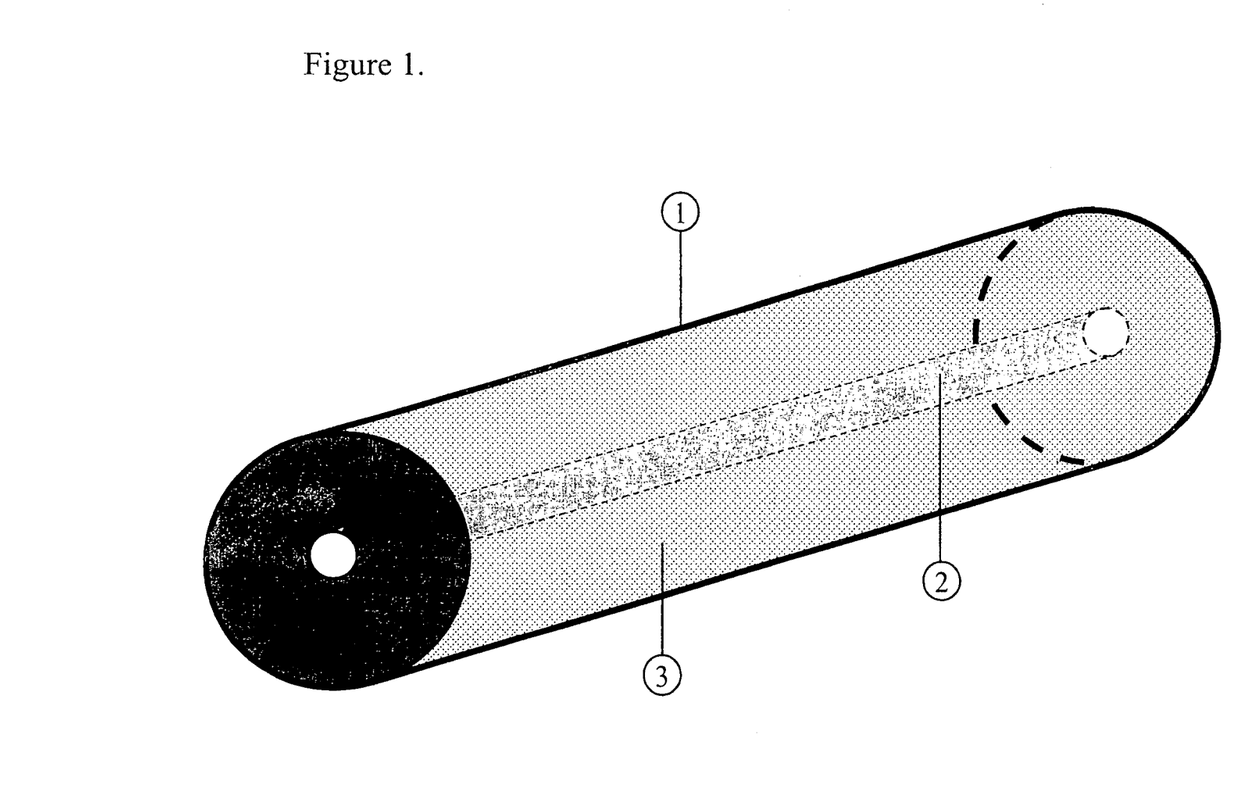
FIG. 1 is a pictorial view of a section of a typical optical fiber 1 constructed of a core 2 and cladding 3.
Figure 4:
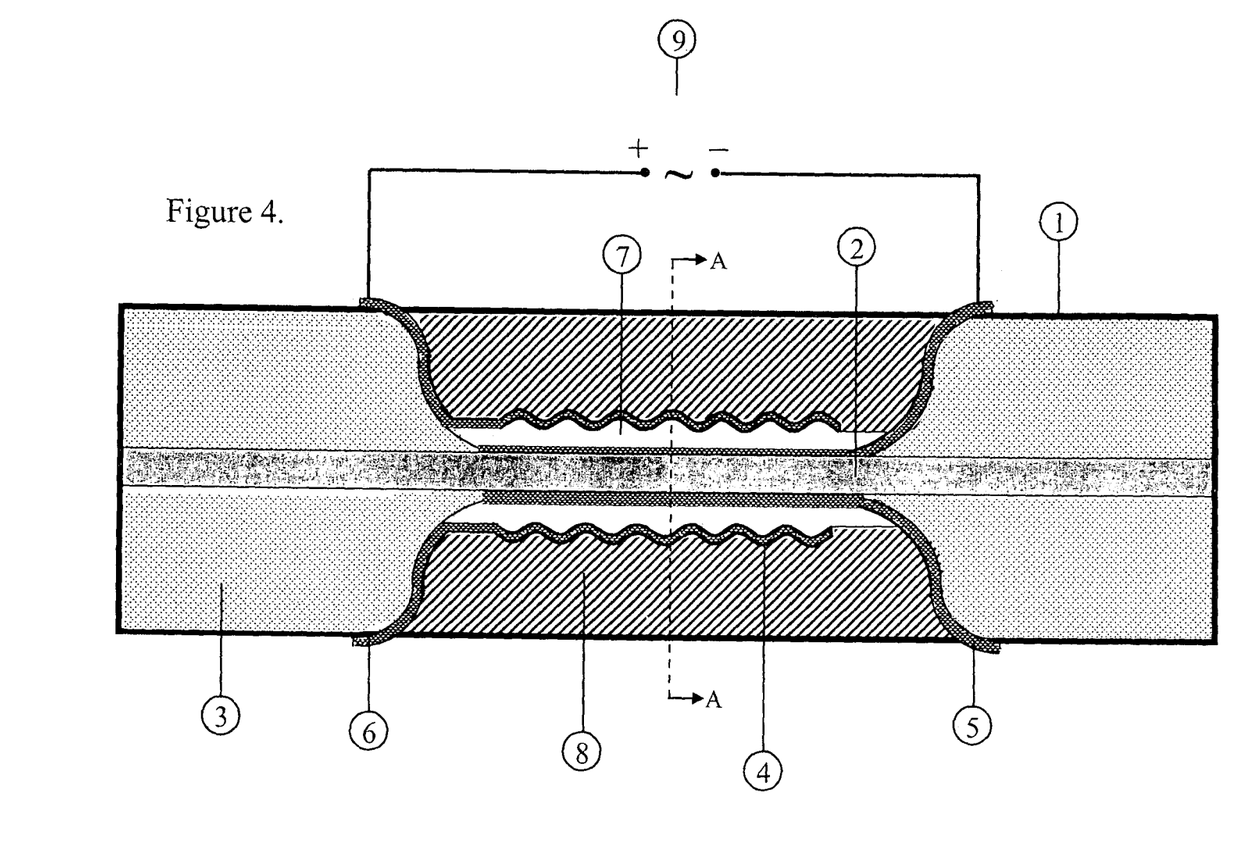
FIG. 4 is a side-elevational view showing the modified section of FIG. 3 is coated with a thin layer of metallic material 6, then a cladding and packaging layer 8 is applied on the top of the metallic material 6. A control signal 9 is applied to the metallic electrodes for tuning the Bragg wavelength.

FIG. 1 shows a typical optical fiber 1 with a core section 2 surrounded by a cladding section 3. This invention provides a new class of optical fiber multiplexers, demultiplexers, couplers, and filters. The methods to produce these devices are also part of this invention. The method to produce the optical fiber apparatus as shown in FIG. 4 describes a small modified section wherein the cladding has been removed from core 2 and a thin metallic material 5 is coated on the fiber and core to form a first electrode. Then a layer of an electrooptic material 7 is coated on the top of the portion of the metallic material or electrode 5 that is on the core 2. A Bragg grating pattern 4 is written into the electrooptic material 7 covering the entire surface of this modified section.

Figure 5:
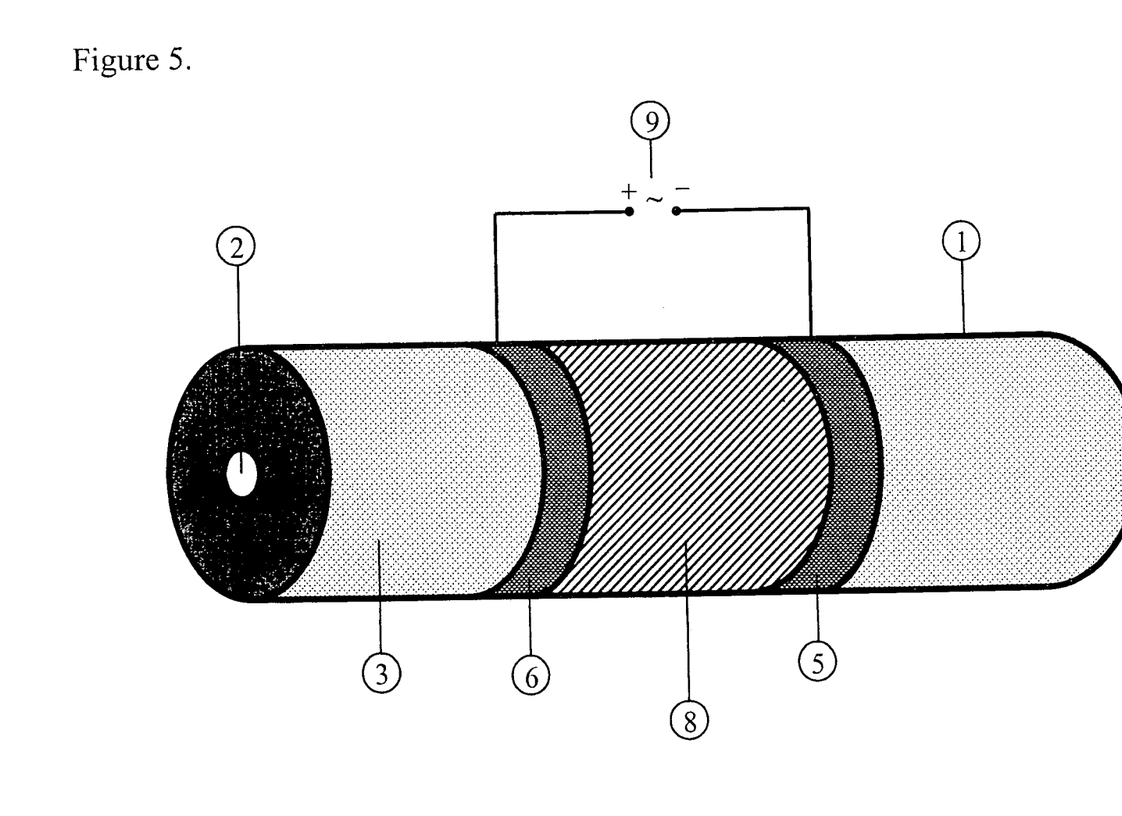
FIG. 5 is a pictorial view of the on-fiber device shown in FIG. 4.

FIG. 4 further shows the invented apparatus wherein two layer of material 6 and 8 are coated on the top of the grating pattern 4 generated into the electrooptic material 7. The first layer is a thin coating of metallic material forming the second (or outer) electrode 6, and the second layer is a packaging material 8 used for support and protection of the apparatus. The pictorial view of the apparatus shown in FIG. 4 is shown in FIG. 5 wherein the inner (or first) electrode 5 and the outer (or second) electrode 6 are used to apply external control signal 9 for tuning of the Bragg wavelength.

Figure 2:
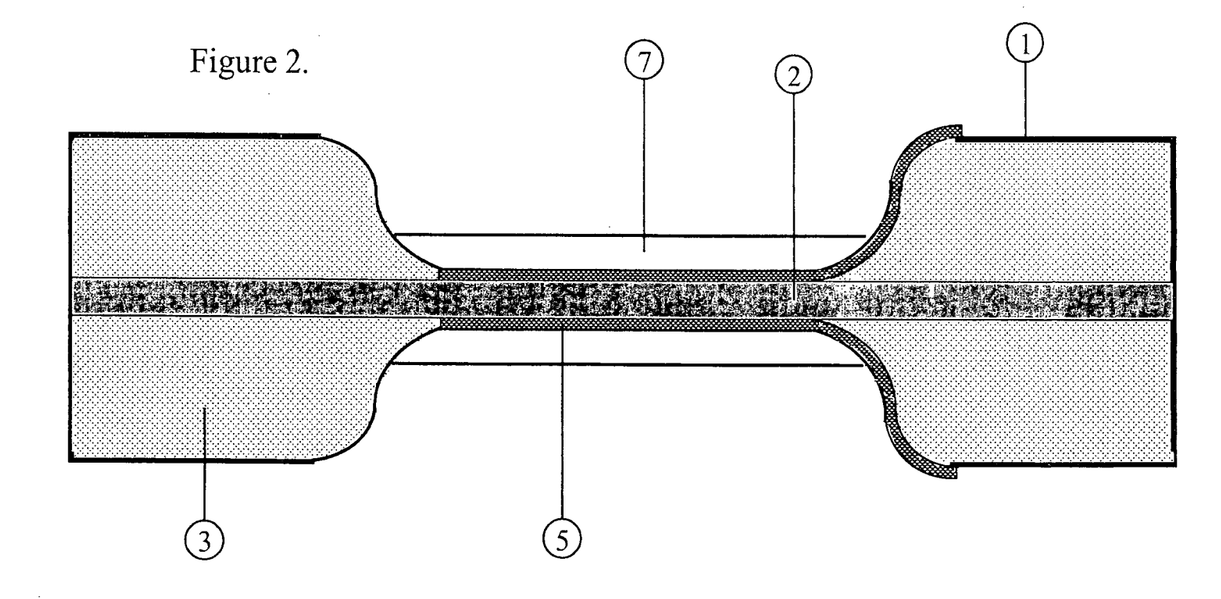
FIG. 2 is a side elevational view partially broken away of the optical fiber of FIG. 1 having the cladding portion of the fiber substantially reduced in thickness and the fiber is coated with a layer of metallic material 5, then with a layer of an electrooptic material 7.

The first step of the process of this invention to produce the apparatus is to reduce the thickness of the cladding material in a section of the optical fiber to a very thin layer as shown in FIG. 2. This can be done by chemically etching or other etching means on the optical fiber 1. Reproducible results can be obtained by determining the rate of etching of the etchant and then carefully monitoring the etching time.

The next step is to coat the modified section with a thin layer of metallic material constructing the first electrode 5 shown in FIG. 2. The coating process can be performed using any of the deposition or coating techniques including plasma deposition, chemical deposition, liquid phase deposition, or any other techniques. Then, a layer of an electrooptic material 7 is coated on the top of the first (or inner) electrode 5 as shown in FIG. 2.

The next step is to apply a photoresist and preferably a liquid photoresist uniformly to the entire surface of the electrooptic material 7 where the grating 4 is to be applied. The length of the section to which the grating 4 is to be applied is generally ranging from a few hundred of micrometers to a few millimeters in length. A holographic or interference method is used to create an interference pattern at the area of the photoresist coating on the optical fiber. The interference pattern exposes the photoresist to duplicate the interference pattern on development of the exposed photoresist by conventionally known means.

The process for writing the Bragg gratings uses the holographic method or the interference pattern method, which can be produced by reflecting the laser beam back upon itself to expose the modified section coated with a photoresist followed by development of the exposed photoresist and then etching of the interference pattern produced in the developed photoresist to produce a Bragg grating pattern into the electrooptic material in the modified section of the optical fiber.

The interference pattern is reproduced in the developed photoresist in the form of a sinusoidal, triangular, or other pattern having peaks and valleys which is preferred as Bragg gratings.

Figure 3:
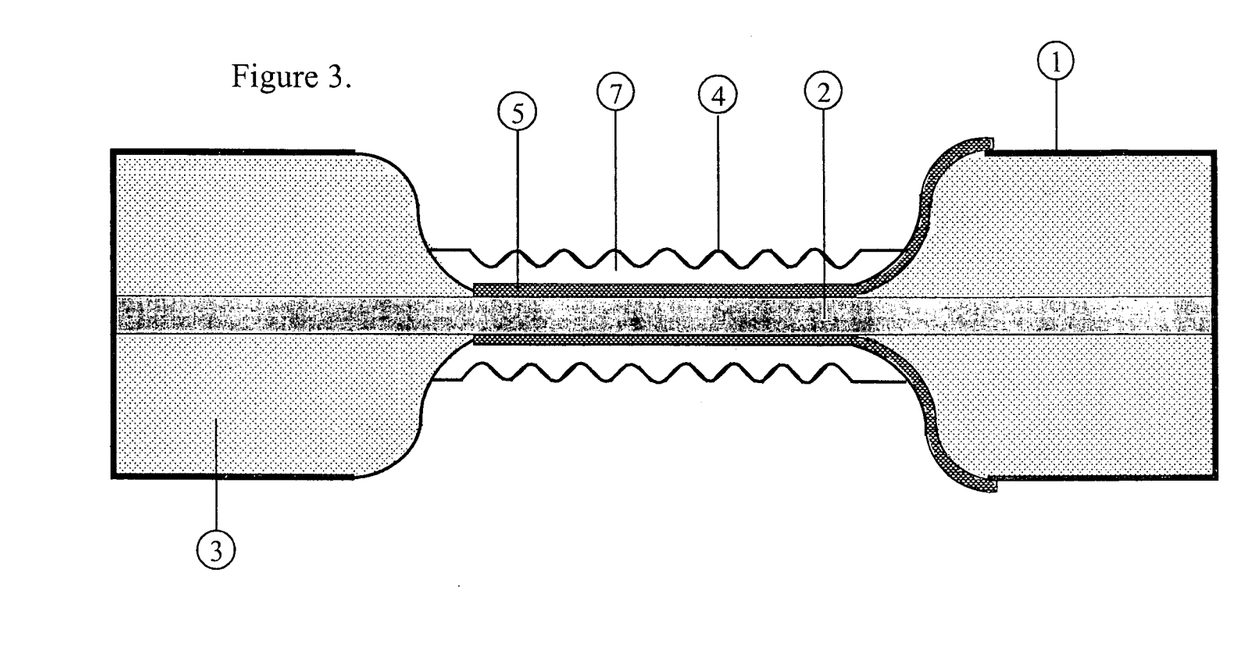
FIG. 3 is a side-elevational view showing the optical fiber of FIG. 2 having a Bragg grating pattern 4 covering the entire surface of said modified section.

FIG. 3 shows the grating pattern 4 etched into the electrooptic material 7 formed by subjecting the developed pattern to different types of etching. Etching of the Bragg grating pattern 4 into the optical fiber will depend upon the composition of the electrooptic material. Chemical etching, plasma etching and ion milling which are well known in the art can be employed.

The exposure and development of the photoresist can be done individually or it can be done simultaneously as taught by El-Sherif, U.S. Pat. No. 4,842,405. The process is not limited to operation on a single optical fiber. Many fibers can be placed in the path of the laser beam and each exposed at the same time. The period of the grating can be controlled in the simultaneous exposure and development method by changing the index of refraction of the developer. Tuning the Bragg wavelength of the produced gratings is achieved by applying external control signal 9 to the electrooptic material 7. The advantages obtained by my process result from the uniformity of the electromagnetic field applied to the Bragg gratings 4. Uniform field exposure on the entire cylindrical surface of the optical fiber is obtained, which eliminates distortions in the gratings.

Figure 6:
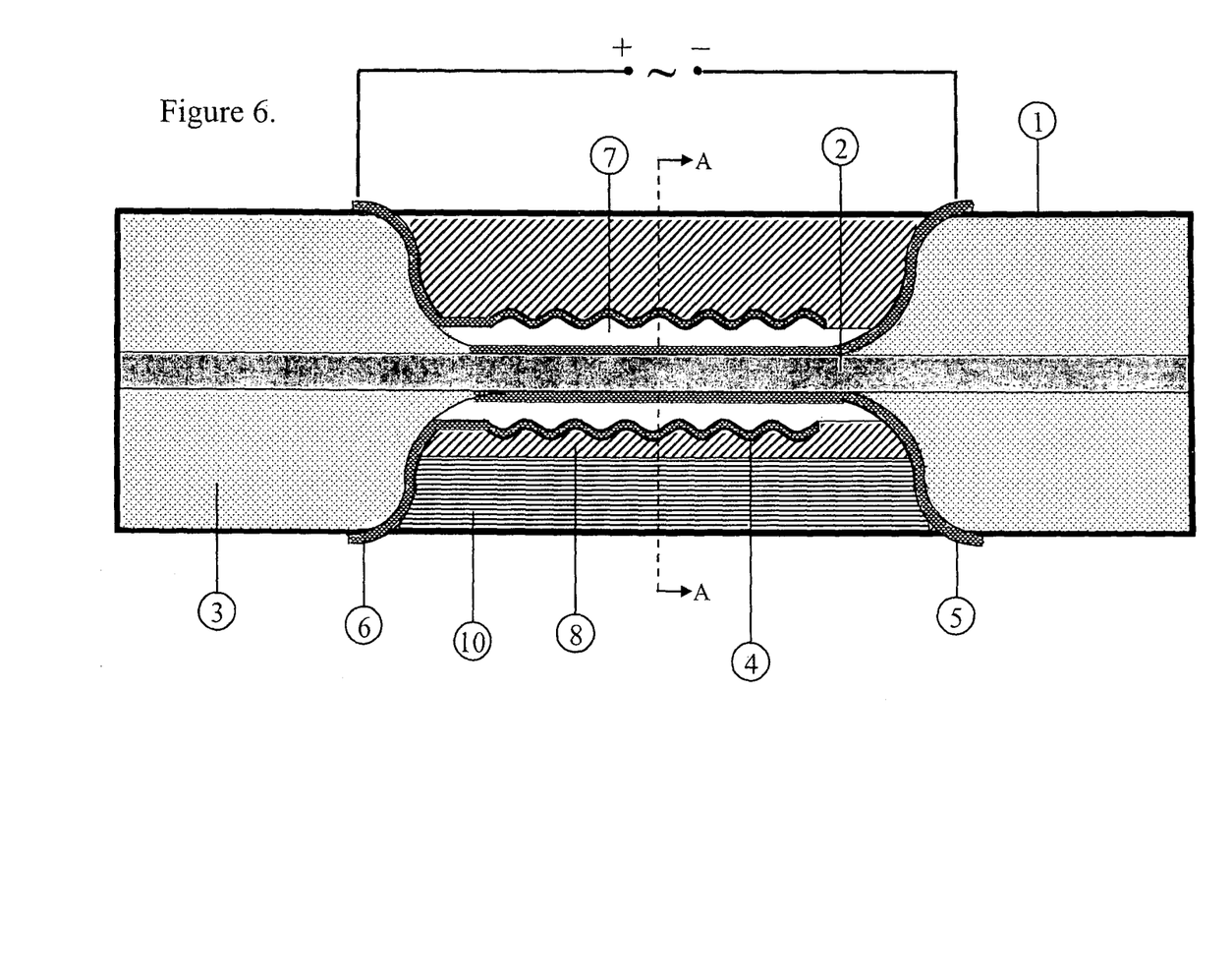
FIG. 6 is a side-elevational view showing the modified section of the fiber is mounted on a photonics chip 10.
Figure 7A:
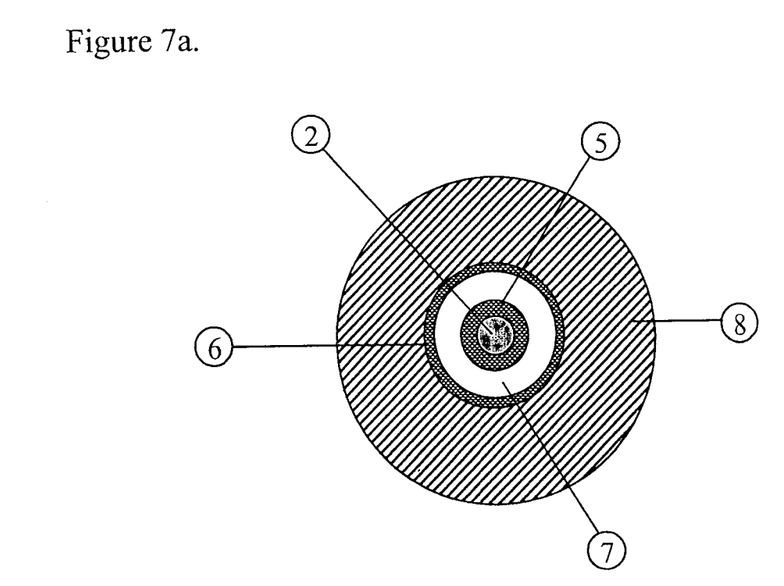
FIG. 7 is a cross-sectional view (A-A) taken at the center of the modified section shown in (a) FIG. 4 and (b) FIG. 6.
Figure 7B:
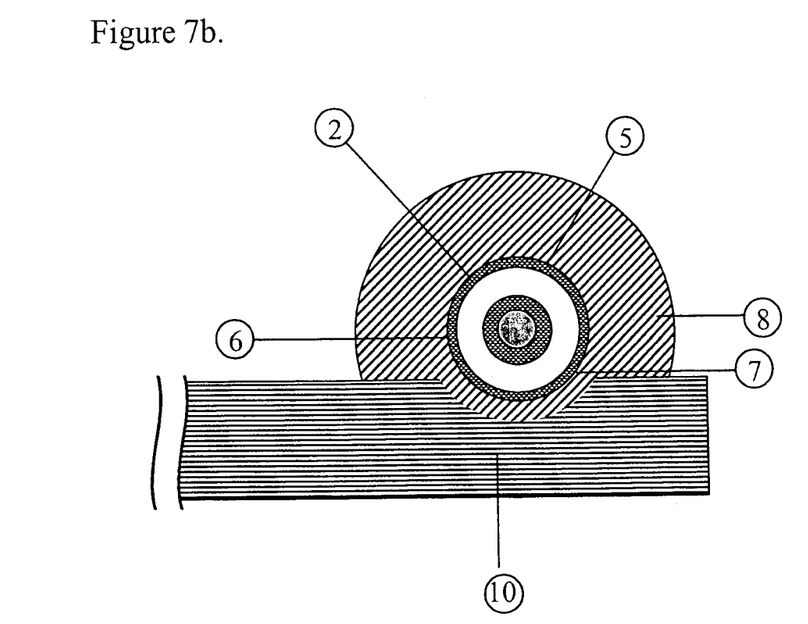

FIG. 6 shows an alternative method of packaging the apparatus, accomplished by mounting the apparatus on a photonics chip 10 for proper exchange of optical signals during multiplexing or demultiplexing.

Figure 8:
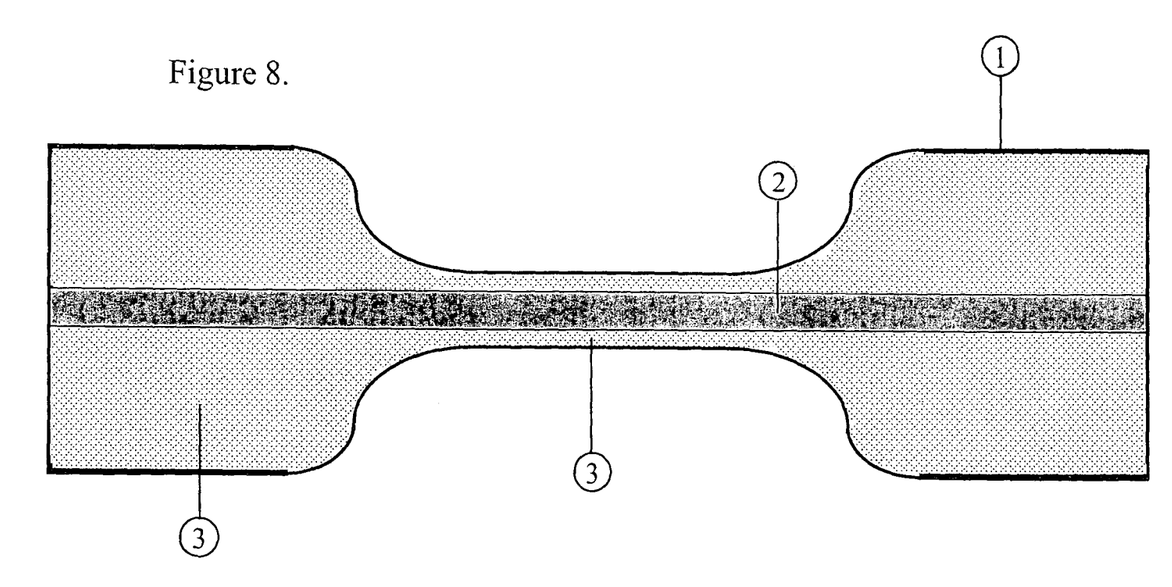
FIG. 8 is a side-elevational view of the optical fiber of FIG. 1 having the cladding portion of the fiber reduced in thickness to a few micrometers.

FIGS. 8-12 show another embodiment of the invented apparatus wherein the cladding is reduced to a thin layer as shown in FIG. 8. Then the grating pattern 4 is written into the thin cladding layer in the modified section as in FIG. 9. The process for constructing the gratings is similar to the one set forth above using a photoresist material.

An interference pattern exposes the photoresist to duplicate the interference pattern on development of the exposed photoresist by conventionally known means. The diffraction pattern reproduced in the developed photoresist in the form of a sinusoidal, triangular, or other pattern having peaks and valleys which is preferred.

Figure 9:
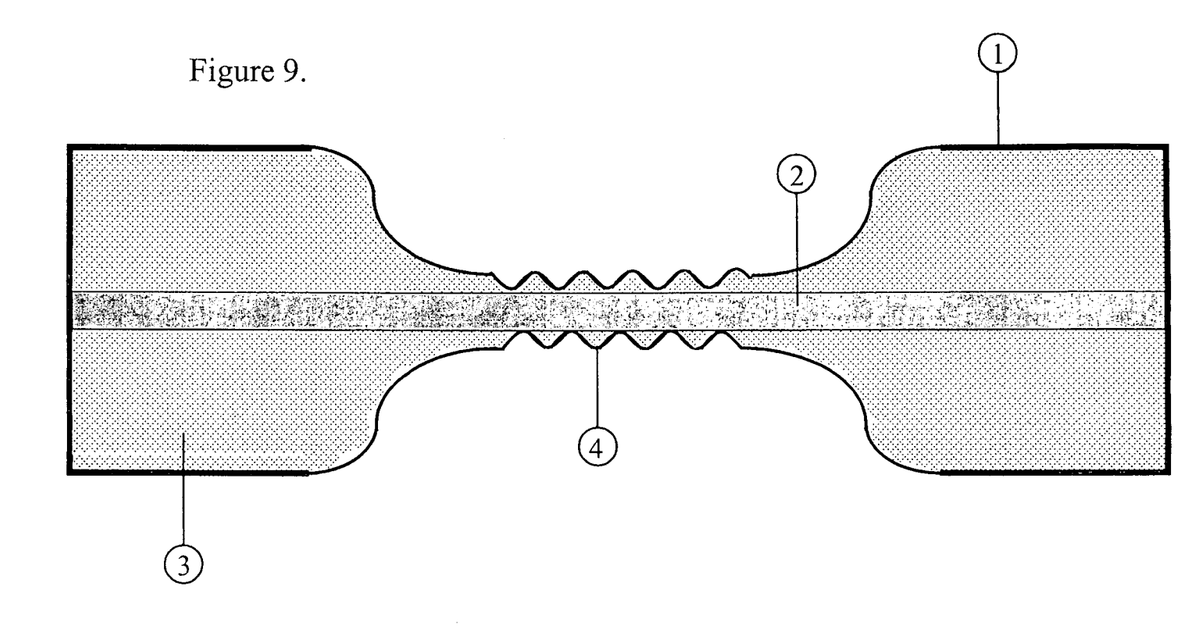
FIG. 9 is a side-elevational view showing the optical fiber 1 after writing the Bragg grating pattern 4 into the modified section of FIG. 8.

FIG. 9 shows the grating 4 etched into the cladding 3 formed by subjecting the developed pattern to chemical etching. In FIG. 9, the etching extends into the cladding which has a thickness of about 1 to 3 microns. Another embodiment of the invention is preferred where the etching extends to the interface of the core and cladding. The exposure and development of the photoresist can be done individually or it can be done simultaneously.

Etching of the diffraction pattern into the optical fiber will depend upon the composition of the optical fiber. Chemical etching, plasma etching and ion milling which are well known in the art can be employed. For example, an optical fiber cladding composed of glass can be etched with either ion milling or with hydrofluoric acid.

The process is not limited to operation on a single optical fiber. Many fibers can be placed in the path of the laser beam and each exposed at the same time.

The period of the grating can be changed in the simultaneous exposure and development method by changing the index of refraction of the developer.

Figure 10:
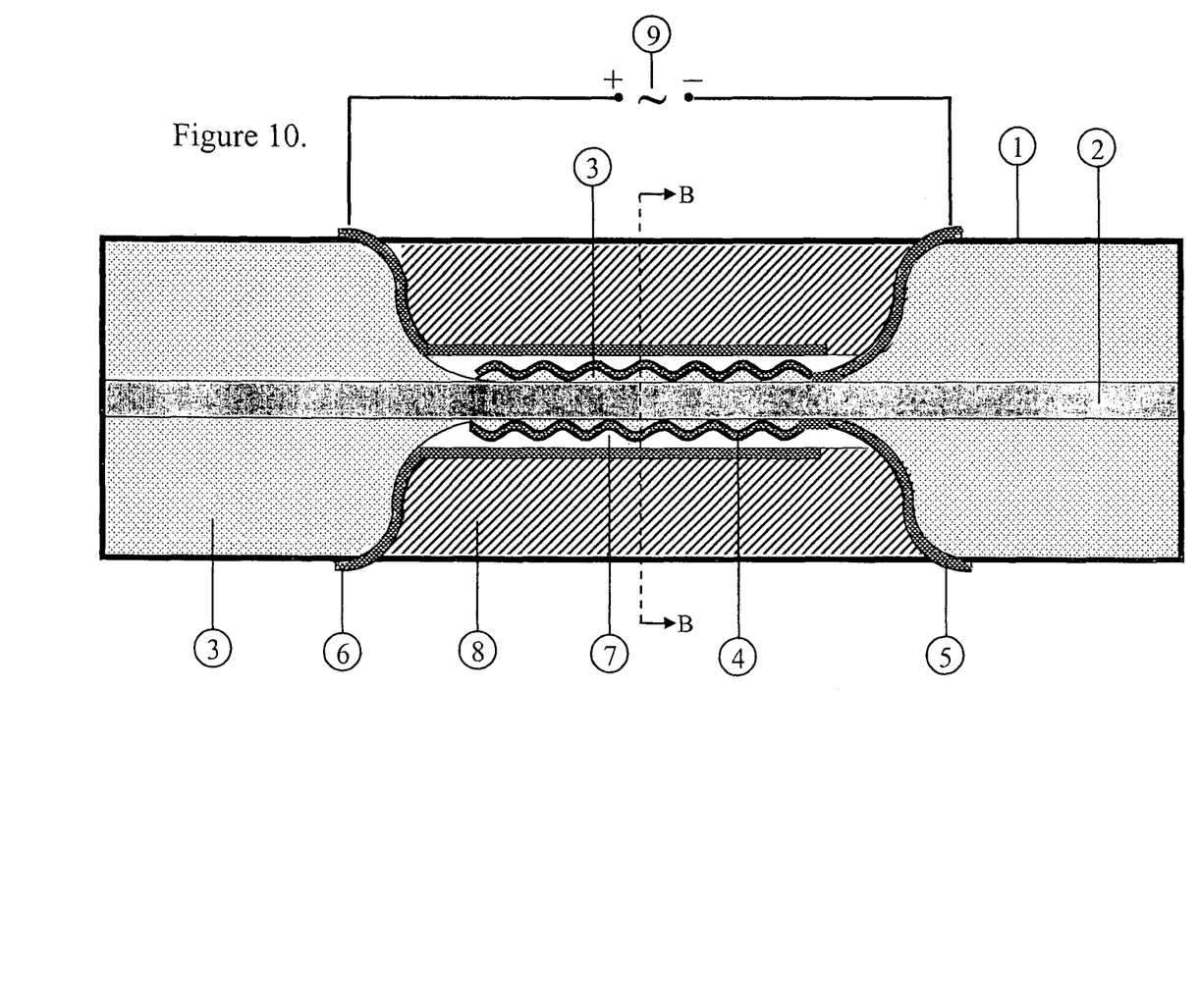
FIG. 10 is a side elevational view showing another embodiment of the invention, said showing the gratings of FIG. 9 are covered with four layers of materials; a first metallic layer 5, an electrooptic material 7, a second metallic layer 6, and a cladding/packaging material 8.

FIG. 10 shows an embodiment of the invented apparatus wherein three layers of material are on the top of the grating pattern 4 generated into the thin layer of the cladding 3 left in the modified section. The first layer is a thin metallic layer constructing the first (or inner) electrode 5. The second layer is an electrooptic material 7 coated on top of the first electrode 5. The third layer is a thin metallic material forming the second (or outer) electrode 6. A fourth layer can be coated on the top of the second electrode 6 constructing a cladding and packaging layer 8.

Figure 11:
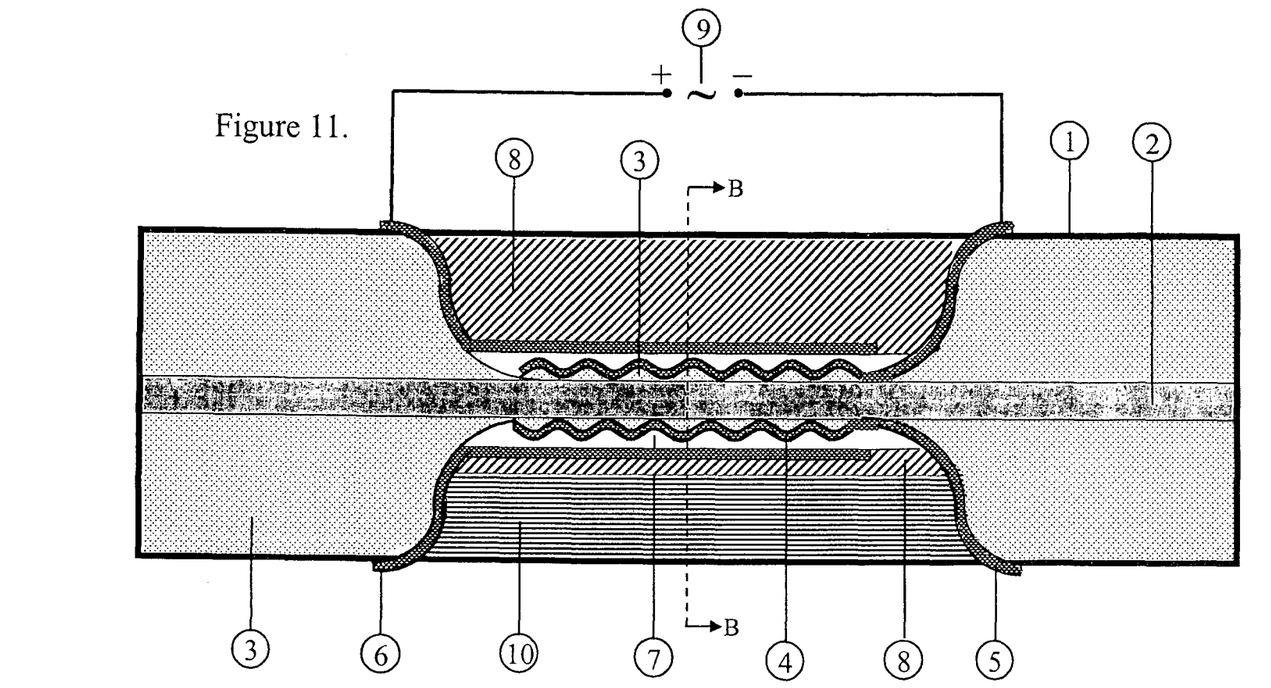
FIG. 11 is a side-elevational view showing the modified section of the fiber is mounted on a photonics chip 10.
Figure 12A:
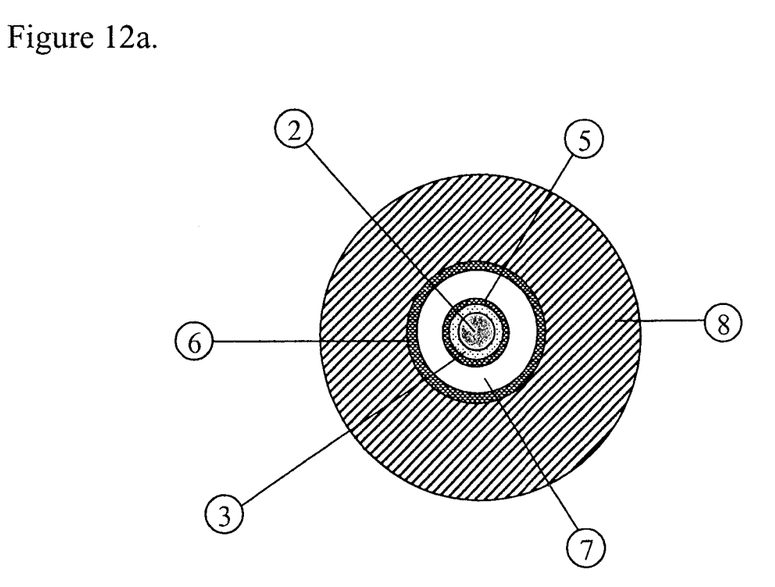
FIG. 12 is a cross-sectional view (B-B) taken at the center of the modified section in (a) FIG. 10 and (b) FIG. 11.
Figure 12B:
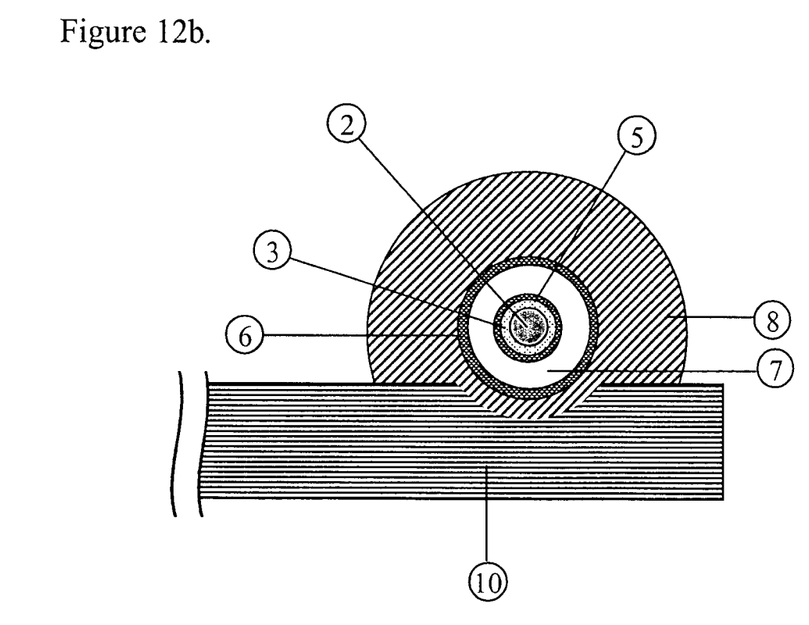

FIG. 11 shows an alternative method of packaging the apparatus, which is by mounting the modified section of the fiber on a photonics chip 10 for proper exchange of optical signals during multiplexing or demultiplexing.

It should be noted that in both structures shown in FIGS. 4 and 10, the inner and outer electrodes are connected to a signal means or power supply 9. The power supply is used to modulate the optical properties of the electrooptic materials which in turn modulates the Bragg grating wavelength. This control signal 9 is used for tuning the Bragg wavelength.

While particular embodiments of the present invention have been illustrated and described, it is not intended to limit the invention to any specific embodiment except as defined by the following claims.

The invention claimed is:

1. Apparatus comprising: a polarization independent tunable Bragg grating pattern in an optical fiber having a cladding layer surrounding a core, the cladding layer including a section that includes:
   an inner transparent electrode surrounding the core;
   an electrooptic material surrounding the inner electrode, the electrooptic material having an inner surface in contact with the inner electrode and an outer surface spaced radially outward from the inner surface, wherein one of the inner surface and outer surface has a continuous and smooth periodic variation that defines a geometrical first Bragg grating, and the other of the inner surface and outer surface is generally cylindrical so that radial thickness of the electrooptic material varies along a length of the electrooptic material based upon the continuous and smooth variation in the one surface; and
   an outer electrode on the outer surface of electrooptic material, and surrounding the electrooptic material so that application of an electric field between the inner and outer electrodes creates a periodic variation in refractive index along the length of the electrooptic material that produces an electrically variable second Bragg grating that together with the geometrical first Bragg grating provides tuning of both a Bragg diffraction angle and a Bragg wavelength of light propagating within the core.

2. The apparatus of claim 1, wherein the first and second Bragg gratings are constructed to diffract the light propagating within the core at the Bragg wavelength and not diffract all other wavelengths to function as a wavelength division de-multiplexer.

3. The apparatus of claim 1, wherein the first and second Bragg gratings are constructed for coupling an incident light into the core at the Bragg wavelength to function as a wavelength division multiplexer.

4. The apparatus of claim 3, wherein the section of the cladding layer that includes the inner and outer electrodes and the electrooptic material is mounted on a photonics chip.

5. The apparatus of claim 1, wherein the first and second Bragg gratings are constructed to reflect light in the core at the Bragg wavelength to function as optical filter.

6. The apparatus of claim 1, wherein the fiber is connected to a bi-directional coupler for the signals coupling and filters applications.

7. The apparatus of claim 1, wherein the first Bragg grating pattern comprises Chirped Bragg gratings that function as a device selected from the group consisting of multiplexer, de-multiplexer, coupler or optical filter with a limited bandwidth.

8. The apparatus of claim 1, which further includes means for applying an external electric signal to the inner and outer electrodes.

9. The apparatus of claim 1 wherein the outer surface of the electrooptic material has the continuous and smooth periodic variation, defining the geometrical first Bragg grating, and the inner surface is generally cylindrical.

10. The apparatus of claim 1 wherein the inner surface of the electrooptic material has the continuous and smooth periodic variation defining the geometrical first Bragg grating, and the outer surface is generally cylindrical.

11. A fiber optic device comprising:
   a core;
   a cladding layer surrounding the core; and
   an electrically tunable Bragg grating section including:
      an inner transparent electrode surrounding the core;
      an electrooptic material surrounding the inner electrode, the electrooptic material having an inner surface in contact with the inner electrode and an outer surface spaced radially outward from the inner surface, wherein one of the inner surface and outer surface has a continuous and smooth periodic variation, that defines a geometrical first Bragg grating, and the other of the inner surface and outer surface is generally cylindrical so that radial thickness of the electrooptic material varies along a length of the electrooptic material based upon the continuous and smooth variation in the one surface; and
      an outer electrode on the outer surface of electrooptic material, and surrounding the electrooptic material so that application of an electric field between the inner and outer electrodes creates a periodic variation in refractive index along the length of the electrooptic material that produces an electrically variable second Bragg grating that together with the geometrical first Bragg grating provides tuning of both a Bragg diffraction angle and a Bragg wavelength of light propagating within the core.

12. The fiber optic device of claim 11, wherein the first and second Bragg gratings are constructed to diffract the light propagating within the core at the Bragg wavelength and not diffract all other wavelengths to function as a wavelength division de-multiplexer.

13. The fiber optic device of claim 11, wherein the first and second Bragg gratings are constructed for coupling an incident light into the core at the Bragg wavelength to function as a wavelength division multiplexer.

14. The fiber optic device of claim 13, wherein the electrically tunable Bragg grating section is mounted on a photonics chip.

15. The fiber optic device of claim 11, wherein the first and second Bragg gratings are constructed to reflect light in said fiber core at the Bragg wavelength to function as optical filter.

16. The fiber optic device of claim 11, wherein the fiber is connected to a bi-directional coupler for signal coupling and filter applications.

17. The fiber optic device of claim 11, wherein the first Bragg grating pattern comprises Chirped Bragg gratings.

18. The fiber optic device of claim 11 wherein the outer surface of the electrooptic material has the continuous and smooth periodic variation and the inner surface is generally cylindrical.

19. The fiber optic device of claim 1 wherein the inner surface of the electrooptic material has the continuous and smooth periodic variation and the outer surface is generally cylindrical.

* * * * *